United States Patent
Klein et al.

(10) Patent No.: US 6,347,141 B1
(45) Date of Patent: Feb. 12, 2002

(54) METHOD OF AND APPARATUS FOR ADAPTATION OF AN ECHO CANCELLER IN A SYSTEM WITH MULTITASKING

(75) Inventors: Jeffrey D. Klein, Irvine; David O. Anderton, Rancho Santa Margarita, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/128,362

(22) Filed: Aug. 3, 1998

(51) Int. Cl.[7] .......................... H04M 9/08; H04B 15/00; H04B 3/20
(52) U.S. Cl. .......................... 379/406.08; 379/406.01; 455/63; 370/290
(58) Field of Search .................. 379/412, 406.01, 379/406.02, 406.06, 406.08, 406.15; 455/63, 570; 370/286, 290

(56) References Cited

U.S. PATENT DOCUMENTS 6,137,881 A * 10/2000 Oh et al. .............. 379/406.08

* cited by examiner

Primary Examiner—Wing F. Chan
(74) Attorney, Agent, or Firm—Knobbe, Martens, Olson & Bear LLP

(57) ABSTRACT

An echo canceller has an adaptive filter with an input coupled to a digitized audio input producing samples at a first rate. The adaptive filter also produces an estimated digitized audio feedback signal at the first rate based upon a set of tap values. A controller is coupled to the adaptive filter and determines the values of the set of tap values. A shared processor is coupled to the adaptive filter and the controller. The shared processor services tasks of the adaptive filter and the controller as well as other devices. When the adaptive filter has converged upon an unknown echo channel response, the controller determines the set of tap values at a rate lower than the first rate.

7 Claims, 3 Drawing Sheets

METHOD OF AND APPARATUS FOR ADAPTATION OF AN ECHO CANCELLER IN A SYSTEM WITH MULTITASKING

BACKGROUND OF THE INVENTION

I. Field of the Invention

The invention relates generally to communications. More specifically, the invention relates to signal processing in a communication system.

II. Description of the Related Art

Wireless telephones are becoming more and more pervasive in modem society. As the demand for wireless telephones increases, the demand for higher performance telephones also increases. Among the features sought by today's consumer are lower cost, longer battery life and increased feature sets. In order to accommodate all of these goals, a typical wireless phone comprises a multitasking microprocessor. The use of a single processor to execute multiple tasks may reduce the power consumption, size and cost of the phone. As the number of features in the phone increases, the demand on processor resources also increases. Thus, a multitasking processor in a wireless telephone is likely to be executing many tasks at one time.

In an efficiently operating telephone, a number of tasks typically appear to run in parallel. Actually, each separate task is carried out for a short period of time and, then, interrupted by the execution of other tasks. After execution of other tasks, the original task is restarted again at the point where operation was interrupted.

As the number of tasks running in parallel increases, the demand on the multitasking processor also increases. It is undesirable to have certain high priority tasks delayed due to the execution of other lower priority tasks. Therefore, it is important to properly prioritize the tasks as well as to reduce the processor resources allocated to each task, if possible. Reducing the processor resources used by the tasks also has the added benefit of decreasing the power consumed by the processor.

Among those tasks in a wireless telephone which should not be delayed are those tasks associated with processing audio signals. If the audio tasks are delayed or sporadically executed, the resulting audio quality may be degraded. The time sensitive nature of these tasks demands that they be executed in real time. Therefore, in a wireless telephone system, functions associated with audio processing and audio transmission are given high priority in the multitasking environment.

One such high priority task associated with audio processing is echo cancellation. If a local user conducts a telephone call using hands-free (i.e., speaker phone) operation, the distant user's audio signal is produced from a speaker which provides sufficient volume for the local user to hear the audio signal without placing his ear in close proximity to the speaker. The local user's voice signal is detected using a microphone. In addition to the local users audio signal, the microphone also detects the reproduced distant user's audio signal output by the speaker. If this signal were to be passed back to the distant user, the distant user would hear his own voice echoed back to him with a noticeable delay. In a typical system, the round-trip delay associated with audio transmission over a wire line and wireless connection can exceed one half of a second. Such a delayed echo signal can be extremely disconcerting to the distant user. In addition, if the amplitude of the echo signal becomes excessive, feedback may occur and the system may become unstable.

In order to reduce the amplitude of such an echo signal to a level which is imperceptible to the distant user, telephones have been designed which include an echo cancellation process. The process of echo cancellation is used to determine the impulse response of an unknown echo channel. In the case of hands-free operation, the unknown echo channel is partially determined by the room response between the speaker and the microphone. The unknown echo channel also includes the response of the speaker and microphone and other intervening circuitry. Typically, the echo channel does not provide a flat frequency response and in order to characterize the echo channel, the impulse response of the echo channel must be determined over a usable band of frequencies. Once the impulse response of the unknown echo channel is identified using adaptive filtering techniques, a replica of the anticipated echo signal is generated. The echo replica is subtracted from the composite signal detected by the microphone to reduce the amplitude of the distant user's audio signal.

An echo canceller is typically implemented as a digital adaptive filter. The frequency and amplitude response of an adaptive filter can be controlled based upon a series of adjustable tap values. The signal input to the adaptive filter is coupled to the digitized distant user's audio signal. Based upon the adjustable tap values, the adaptive filter produces an estimated echo response signal for each audio sample received. In addition, an adaptive filter controller determines updated tap values each time a new digitized audio sample is received. Each of these tasks (tap value determination and filtering) consumes resources of the multitasking processor executing the echo cancellation process. As noted above, it is advantageous to limit the multitasking resources consumed by each process operating in parallel—especially those high priority tasks which must operate in real-time.

Therefore, there has been a long felt need in the industry to reduce the multitasking resources associated with the echo cancellation process.

SUMMARY OF THE INVENTION

An adaptive filter is used to estimate an unknown echo channel response. A controller determines a set of tap values for use by the adaptive filter to converge on the unknown echo channel response. A shared processor executes tasks generated by the adaptive filter and the controller. The shared processor prioritizes the tasks according to an assigned priority. The priority assigned to the adaptive filter must remain high throughout operation in order to maintain voice quality. However, the priority assigned to the controller is a function of the degree of convergence of the adaptive filter on the unknown echo channel response. As the adaptive filter converges, the priority assigned to the controller's task is decreased. In this way, the resources of the shared processor consumed by the controller are decreased.

The invention comprises an echo canceller which has an adaptive filter. The adaptive filter has an input coupled to a digitized audio input producing samples at a first rate. The adaptive filter produces an estimated digitized audio feedback signal at the first rate based upon a set of tap values. The echo canceller also has a controller coupled to the adaptive filter which determines the set of tap values. A shared processor is coupled to the adaptive filter and the controller and services tasks of the adaptive filter and the controller. When the adaptive filter has converged upon an unknown echo channel response, the controller determines the set of tap values at a rate lower than the first rate. In one embodiment of the echo canceller, a priority of the tasks of the controller is determined based upon a degree of convergence of the adaptive filter on the unknown echo channel response. For example, the degree of convergence may be determined based upon an echo return loss value. The value of the lower rate may be determined based upon a degree of convergence of the adaptive filter on the unknown echo channel. In one embodiment, the adaptive filter and the controller are each assigned a priority at which the shared processor services tasks therefrom and the priority of the controller is lowered as a degree of convergence of the adaptive filter on the unknown echo channel is increased.

One aspect of the present invention involves a method of adaptation of echo cancellation. A task of filtering a digital audio input signal is executed to generate an estimated digital feedback audio signal. A task of determining a set of tap values to be used by the task of filtering is also executed. A priority of the determining task is determined based upon a degree of convergence of the task of filtering on an unknown echo channel response. In one embodiment, the determining task is executed at the same rate as the filtering task if the degree of convergence is low.

BRIEF DESCRIPTION OF THE DRAWINGS

The features, objectives, and advantages of the invention will become more apparent from the detailed description set forth below when taken in conjunction with the drawings wherein like parts are identified with like reference numeral throughout and wherein.

DETAILED DESCRIPTION OF THE INVENTION

Figure 1:
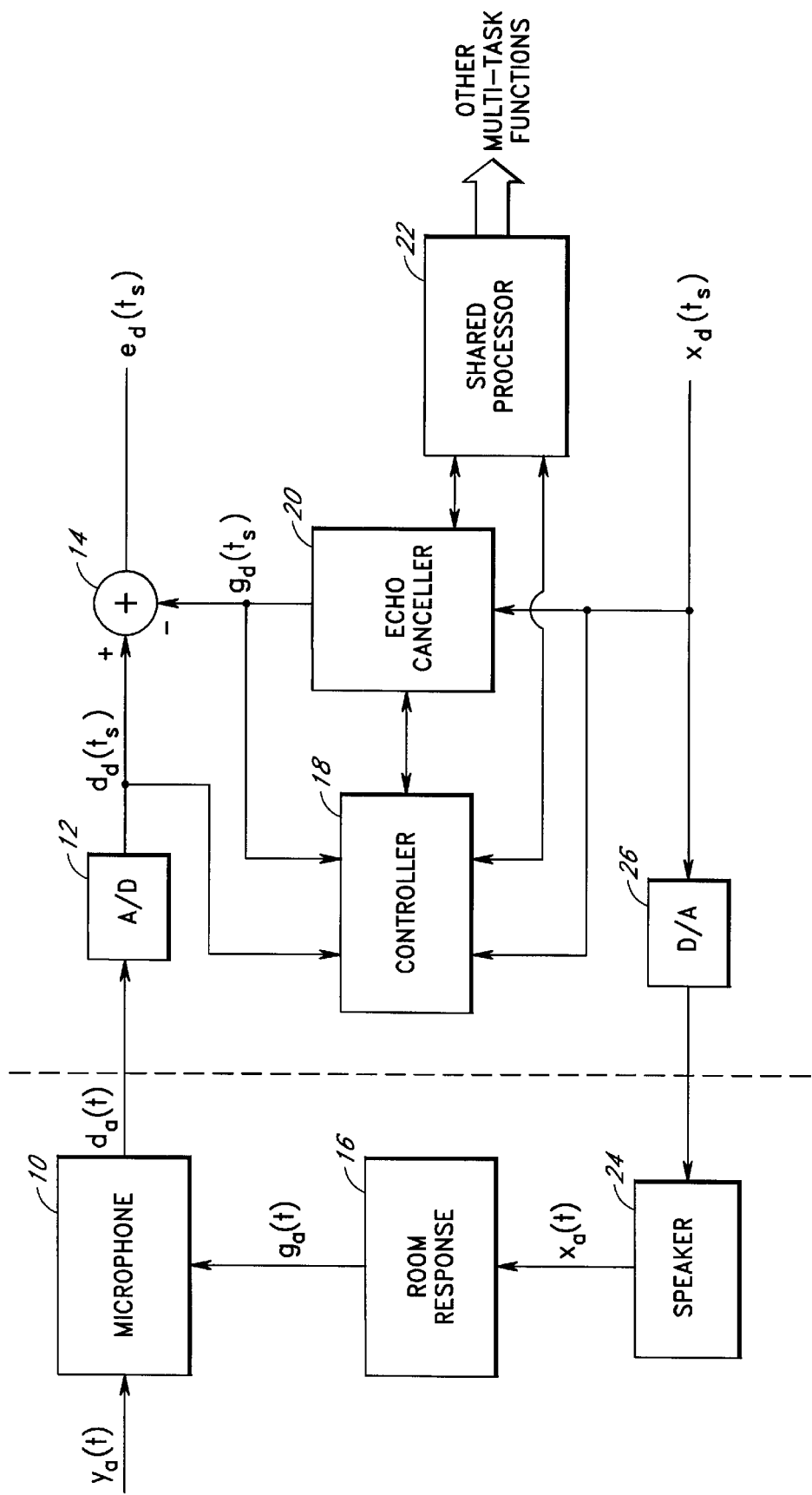
FIG. 1 is a block diagram showing an echo canceller operating in accordance with the invention.

FIG. 1 is a block diagram showing an echo canceller operating in accordance with the invention. A digital audio input, $X_d(t_s)$, represents the digitized audio signal received from the distant user. The digital audio input, $X_d(t_s)$, is input into a digital to analog converter 26 and also into an adaptive filter echo canceller 20. The digital to analog converter 26 converts the digital audio samples into analog form and outputs an analog electrical signal to a speaker 24. The speaker 24 converts the analog electrical signal into an audible signal and broadcasts it into the environment. A microphone 10 detects an audio room talk signal, $y_a(t)$. In addition, the microphone 10 detects an audio feedback signal, $g_a(t)$, which is created from the audio output signal $x_a(t)$, based upon the audio response of the room as represented by a room response block 16 in FIG. 1. The audio characteristics of the room response block 16 are dependent upon the operating environment of the device. The transfer function of the room response 16 is likely to change over time as the device itself or objects near it move around within the environment. The microphone 10 combines the audio room talk and the audio feedback and produces a corresponding electrical combined audio signal, $d_a(t)$. An analog to digital converter 12 digitizes the combined audio signal, $d_a(t)$, to produce a combined digital signal, $d_d(t_s)$. The estimated digital feedback, $g_d(t_s)$, is subtracted from the combined digital signal, $d_d(t_s)$, by a combiner 14. The output of the combiner 14 is an echo compensated digital output, $e_d(t_s)$.

A tap value controller 18 sets the filter coefficients of the adaptive echo canceller 20. The tasks performed by the echo canceller 20 and the controller 18 are executed by a shared processor 22. The shared processor 22 is a multitasking processor. For example, the device partially shown in FIG. 1 may comprise other digital and analog circuitry such as circuitry necessary to implement a digital wireless telephone such as a Global System for Mobile Communication (GSM), coded division multiple access (CDMA) or time division multiple access (TDMA) digital telephone. These other circuits also create tasks which must be carried out by the shared processor 22.

For each digital data sample received as the digital audio input signal, $x_d(t_s)$, the echo canceller 20 produces one estimated digital feedback sample, $g_d(t_s)$. Thus, the echo canceller 20 must operate at the same rate at which digital audio samples are received. The echo canceller 20 is a high-priority task because of the need to regularly produce the echo compensated digital output, $e_d(t_s)$, and, thus, the echo canceller 20 may preempt other lower priority tasks also executed by the shared processor 22.

In accordance with the invention, the controller 18 may use a variety of different means by which to determine the tap values for the echo canceller 20. One method by which such controllers determine task values is the least mean squared method. The least mean squared method operates based upon the fact that when the estimated digital feedback properly predicts the characteristics of the unknown echo channel, the average power in the echo compensated digital output, $e_d(t_s)$, is less than the average power in the combined audio signal, $d_d(t_s)$. The lowest value of the echo compensated digital output, $e_d(t_s)$, is achieved when the estimated digital feedback, $g_d(t_s)$, most closely estimates the unknown echo channel characteristic.

One gauge by which convergence of the echo canceller 20 to the characteristics of the unknown echo channel may be measured is called the echo return loss. In general, the echo return loss represents a measure of energy that has been removed from the combined digital signal as it passes through the combiner 14 which removes the echo estimate. The echo return loss can be expressed in several ways. It may be expressed as the ratio of the variance of the combined digital signal, $d_d(t_s)$ to the variance of the echo compensated digital output, $e_d(t_s)$. Another common echo return loss gauge is the power ratio such as given in Equation 1.

$$\text{Echo Return Loss (dB)} = 10\log\left[\overline{|d_d(t_s)|}^2 / \overline{|e_d(t_s)|}^2\right] \quad \text{Equation 1}$$

where:

$$\overline{|d_d(t_s)|}^2$$

is the average power of the combined digital signal; and $$\overline{|e_d(t_s)|}^2$$

is the average power in the echo compensated digital output. If the echo return loss reaches between 25 and 30 decibels (dB) when the local audio signal is minimal, for example, it may be assumed that the echo canceller 20 has converged upon the characteristic of the unknown echo channel. Because the echo compensated digital output, $e_d(t_s)$, is a function of the combined audio signal, $d_c(t)$, and the estimated digital feedback, $g_d(t_s)$, the controller 18 may be coupled to any two of these in order to determine the echo return loss.

As the echo return loss ratio increases above a predetermined limit, it is assumed that the controller 18 has converged upon tap values which allow the echo canceller 20 to accurately predict the character of the unknown echo channel. Under the prior art, the tap values generated by the controller 18 as controlled by the shared processor 22 continue to be updated each time a new audio sample is received. However, according to the present invention, the tap values are not necessarily updated at the same rate at which audio samples are received once the echo canceller 20 has converged. Although the room response 16 is a function of time, the rate at which the room response changes is typically slow in the steady state. The small steady state changes can be tracked by the controller 18 at a slower rate than the rate at which audio data is received. Should an abrupt change of the room response occur, the estimated digital feedback signal, $g_d(t_s)$, would no longer be an accurate estimate of the unknown echo channel characteristic. Therefore, the echo return loss value would decrease indicating that the echo canceller 20 is no longer converged. Such an abrupt change might happen if, for example, the device were removed from a rather enclosed environment (such as the interior of a car) to a more open environment (such as the out-of-doors.) When the echo canceller 20 is no longer converged, it is important to begin updating the tap values at a more rapid rate in order to avoid transmission of an undesired echo. For example, the tap values may be updated at the same rate at which audio data is transmitted and received.

Therefore, according to invention, the controller 18 does not necessarily update the tap values for the echo canceller 20 at the same rate at which the digital audio samples are received. Instead, the task of updating the tap values is given a priority based upon whether the echo canceller 20 has converged upon the transfer characteristic of the unknown echo channel. For example, in one embodiment, the tap value determination task priority may be determined as a non-increasing integer function of the echo return loss.

For example, a multitasking environment may allow one of eight different priority levels to be assigned to each task. In one embodiment, seven different threshold values for the echo return loss are determined each corresponding to a transition from one priority level to another. As the value of the echo return loss changes as the echo canceller converges or diverges, the priority level of the task is transitioned from one priority level to the next based upon the transition thresholds. In another embodiment, 14 different threshold values are determined each corresponding to a transition from one priority level to the next higher level or from a priority level to the next lower level. In this way, the threshold for transitioning into a priority level and back to the previous value may be offset from one another introducing stability through the use of hystersis.

When the tap value determination task is assigned a high priority, the shared processor 22 serves the requests from the controller 18 at a relatively high rate. As the priority of the tap value determination task is lowered, the resources of the shared processor 22 may be dedicated to other tasks and the frequency at which the tap values determination task is executed is lowered. In this way, the resources of the shared processor 22 are conserved.

Although the echo canceller 20, the controller 18, and the shared processor 22 are shown as separate blocks in FIG. 1, these three process blocks as well as other process blocks may be embodied in a single integrated circuit such as an application specific integrated circuit (ASIC). In another embodiment, the shared processor 22 may be an off-the-shelf microprocessor and the echo canceller 20 and the controller 18 may be software or firmware processes executed by the shared processor 22.

Figure 2:
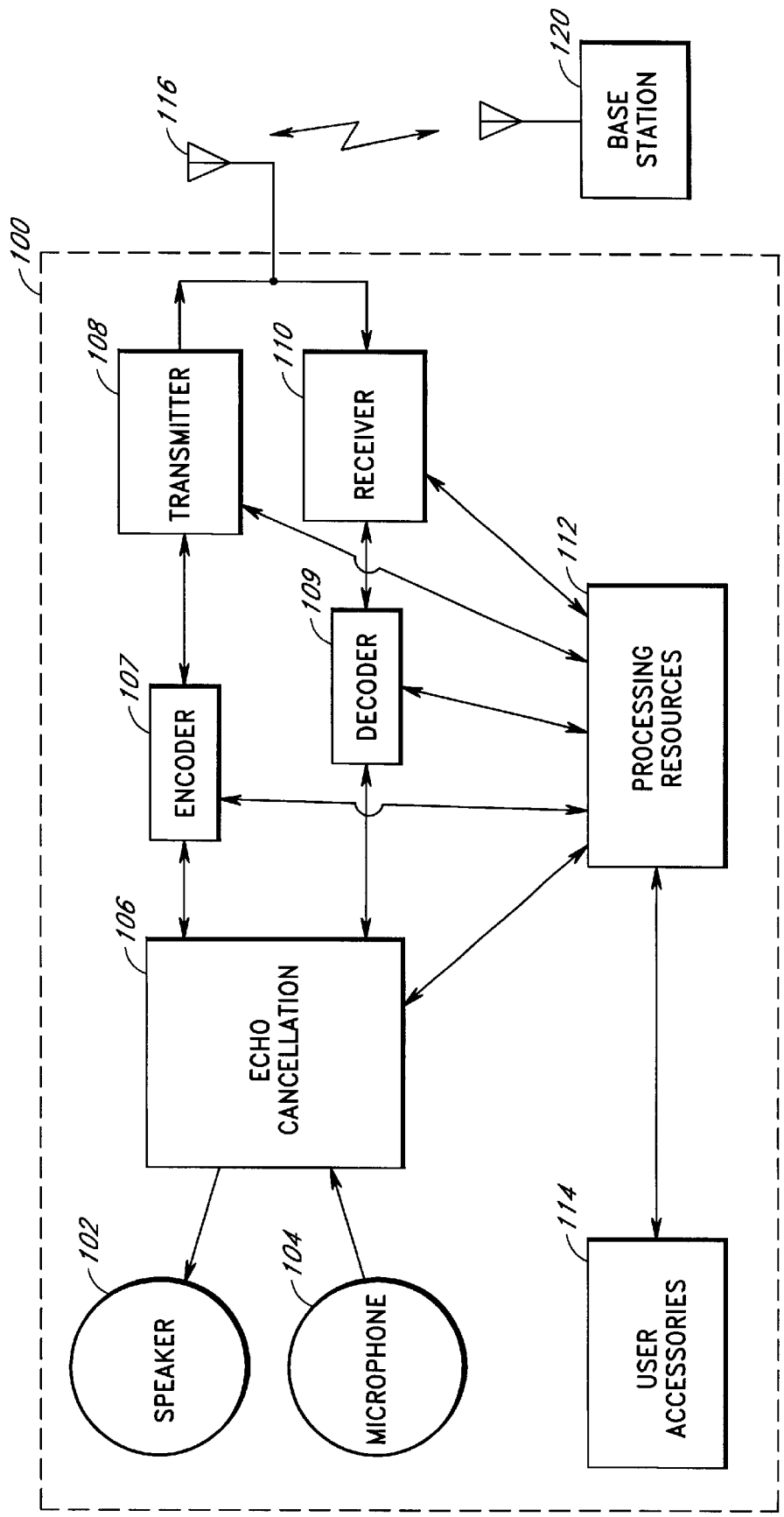
FIG. 2 is a block diagram showing an exemplary embodiment within which the echo canceller of FIG. 1 may operate.

FIG. 2 is a block diagram showing an exemplary embodiment within which the echo canceller of FIG. 1 may operate. In FIG. 2, the echo canceller operates within a wireless telephone unit such as a personal communication system (PCS), cellular, wireless local loop (WLL) unit, for example. A phone 100 exchanges signals through an antenna 116 with a base station 120. The phone 100 receives radio frequency signals through a receiver 110. The receiver 110 produces digital data bits which it passes to a voice decoder 109. The decoder 109 decodes the received data bits comprising compressed speech signals to produce digital voice data. The decoder 109 passes digital voice data to an echo cancellation process 106 which operates in accordance with the invention. The echo cancellation process 106 is coupled to a speaker 102 and a microphone 104 for production and detection of audible signals, respectively. The echo cancellation process 106 produces digital voice data which it passes to a voice encoder 107. The encoder 107 converts the digital voice signals into digital data bits which are compressed for efficient transmission. The encoder 107 passes the digital data bits to a transmitter 108. The transmitter 108 creates high frequency signals for transmission to the base station 120.

The operation of the transmitter 108, the receiver 110, the encoder 107, decoder 109 and the echo cancellation process 106 are controlled by and compete for processing resources 112. In addition, the phone 100 comprises user accessories 114 which also compete for processing resources 112. For example, the user accessories 114 may comprise data services such as an electronic mail program or it may comprise data storage or a myriad of other functions. In particular, the encoder 107, the transmitter 108, the decoder 109 and the receiver 110 demand high priority usage of the processing resources 112 in order to produce high quality voice signals.

Figure 3:
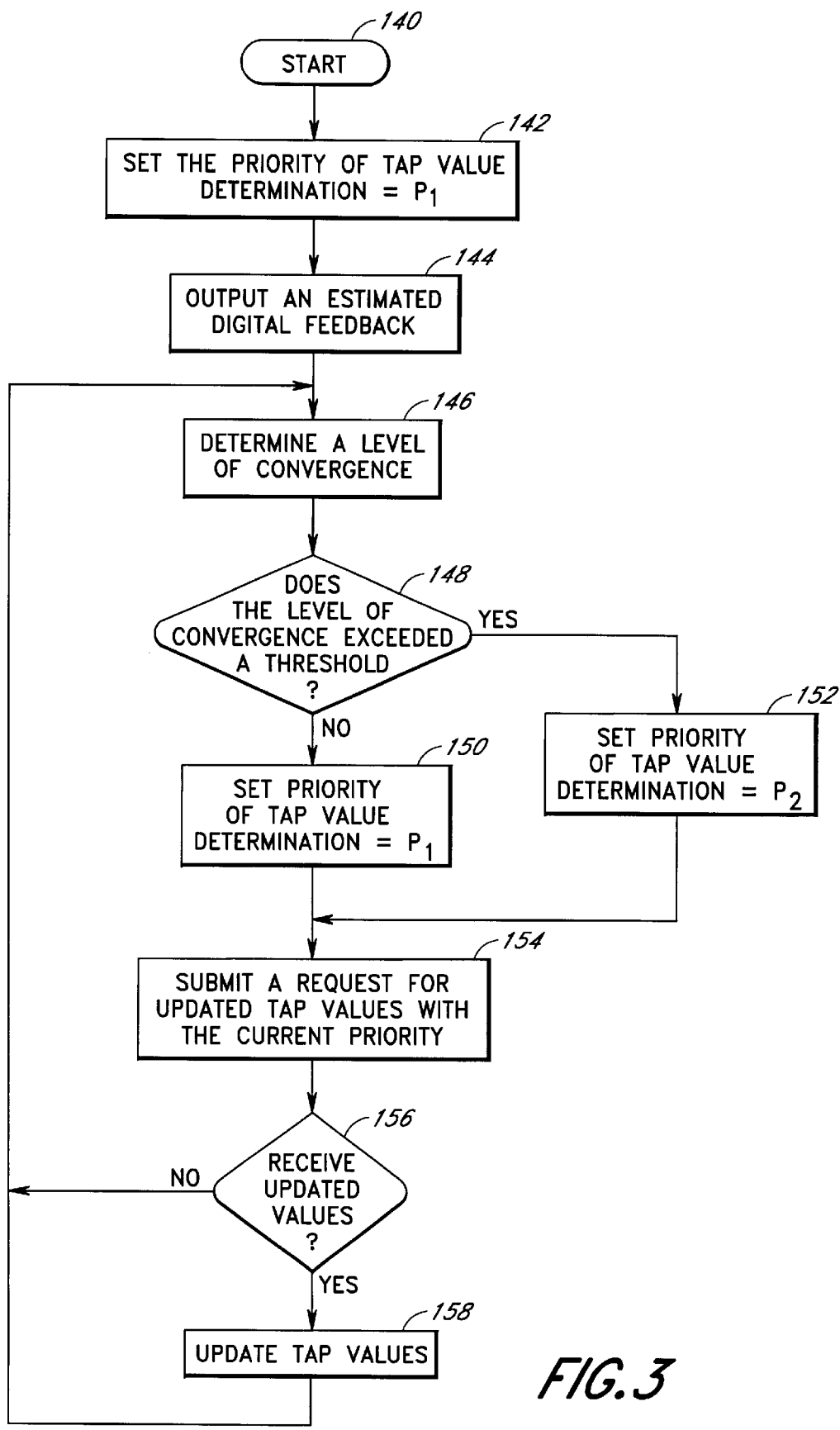
FIG. 3 is a flow chart illustrating exemplary operation according to the invention.

FIG. 3 is a flow chart illustrating exemplary operation according to the invention. In FIG. 3, the task of tap value determination may be assigned one of two values: top priority $P_1$, or secondary priority $P_2$. Flow begins in start block 140. In block 142, the priority of the tap value determination task is set to top priority $P_1$. In block 144, an estimated feedback signal is produced by the filtering task. In block 146, a level of convergence is determined. Block 148 determines whether the level of convergence exceeds a threshold. If so, the priority of the tap value determination process is set to priority $P_2$ in block 152. If not, the priority of the tap value determination process is set to priority $P_1$. in block 150. Either way, flow continues to block 154 where a request for processor resources to calculate new tap values is submitted. Block 156 determines whether new tap values have been received. If so, the tap values of the filter are updated with the new values in block 158 and flow continues back to block 144. If not, flow continues to block 144 where the previous tap values are used. Whether new tap values are calculated may depend upon the current load on the processing resources as well as the length of time since the last tap value request was executed. A myriad of alternative embodiments included within the scope of the invention are readily apparent upon examination of FIG. 3 including the simple re-arrangement of the blocks.

Although the operation of the invention was described above with reference to a digital telephone operating in a hands-free environment, the invention may be applied in a variety of environments in which an echo canceller is controlled by a shared processor.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning of equivalency of the claims are to be embraced within their scope.

What is claimed is:

1. An echo canceller comprising:
    an adaptive filter having an input coupled to a digitized audio input producing samples at a first rate, said adaptive filter producing an estimated digitized audio feedback signal at said first rate based upon a set of tap values;
    a controller coupled to said adaptive filter and determining said set of tap values; and
    a shared processor coupled to said adaptive filter and said controller and servicing tasks of said adaptive filter and said controller;
    wherein, when said adaptive filter has converged upon an unknown echo channel response, said controller determines said set of tap values at a rate lower than said first rate.

2. The echo canceller of claim 1 wherein a priority of said tasks of said controller is determined based upon a degree of convergence of said adaptive filter on said unknown echo channel response.

3. The echo canceller of claim 2 wherein said degree of convergence is determined based upon an echo return loss value.

4. The echo canceller of claim 1 wherein a value of said lower rate is determined based upon a degree of convergence of said adaptive filter on said unknown echo channel.

5. The echo canceller of claim 1 wherein said adaptive filter and said controller are each assigned a priority at which said shared processor services tasks therefrom and wherein said priority of said controller is lowered as a degree of convergence of said adaptive filter on said unknown echo channel is increased.

6. A method of adaptation of echo cancellation comprising the steps of:
    executing a task of filtering a digital audio input signal to generate an estimated digital feedback audio signal;
    executing a task of determining a set of tap values to be used by said task of filtering; and
    determining a priority of said task of determining based upon a degree of convergence of said task of filtering on an unknown echo channel response.

7. The method of claim 6 wherein said step of executing said task of determining is executed at the same rate as said step of executing said task for filtering if said degree of convergence is low.

* * * * *